United States Patent
Sahu et al.

(10) Patent No.: US 10,556,834 B2
(45) Date of Patent: Feb. 11, 2020

(54) HAZING CONTROL FOR CARBONATABLE CALCIUM SILICATE-BASED CEMENTS AND CONCRETES

(71) Applicant: Solidia Technologies, Inc., Piscataway, NJ (US)

(72) Inventors: Sadananda Sahu, Tallahassee, FL (US); Rukyah Hennessy, Jersey City, NJ (US); Sean Quinn, North Plainfield, NJ (US); Vincent Meyer, Saint Quentin Fallavier (FR)

(73) Assignees: SOLIDIA TECHNOLOGIES, INC., Piscataway, NJ (US); HOLCIM TECHNOLOGY LTD., Holderbank (CH)

( * ) Notice: Subject to any disclaimer, the term of this patent is extended or adjusted under 35 U.S.C. 154(b) by 188 days.

(21) Appl. No.: 15/451,344

(22) Filed: Mar. 6, 2017

(65) Prior Publication Data
US 2017/0260096 A1    Sep. 14, 2017

Related U.S. Application Data

(60) Provisional application No. 62/307,315, filed on Mar. 11, 2016.

(51) Int. Cl.
| | | |
|---|---|---|
| C04B 7/00 | (2006.01) | |
| C04B 40/00 | (2006.01) | |
| C04B 7/34 | (2006.01) | |
| C04B 28/00 | (2006.01) | |
| C04B 32/00 | (2006.01) | |

(52) U.S. Cl.
CPC .............. *C04B 40/0039* (2013.01)

(58) Field of Classification Search
USPC .......................................... 106/638
See application file for complete search history.

(56) References Cited

U.S. PATENT DOCUMENTS

| | | | | |
|---|---|---|---|---|
| 2013/0087075 | A1* | 4/2013 | Massa | C04B 28/18 |
| | | | | 106/672 |
| 2015/0033989 | A1* | 2/2015 | Perez-Pena | C04B 22/16 |
| | | | | 106/691 |
| 2016/0096773 | A1* | 4/2016 | Quinn | C04B 28/24 |
| | | | | 106/713 |
| 2016/0272545 | A1* | 9/2016 | Atakan | C04B 28/24 |

FOREIGN PATENT DOCUMENTS

| | | |
|---|---|---|
| DE | 117437 A1 | 1/1976 |
| GB | 2360769 A | 10/2001 |
| JP | 2000-327398 A | 11/2000 |
| WO | 2009/132692 A1 | 11/2009 |
| WO | 2016/022485 A1 | 2/2016 |

\* cited by examiner

*Primary Examiner* — James E McDonough
(74) *Attorney, Agent, or Firm* — Dentons US LLP

(57) ABSTRACT

The invention provides novel methods and compositions that mitigate the occurrence of hazing of products made from carbonatable calcium silicate-based cements. The methods and compositions of the invention may be applied in a variety of cement and concrete components in the infrastructure, construction, pavement and landscaping industries.

22 Claims, 16 Drawing Sheets

HAZING CONTROL FOR CARBONATABLE CALCIUM SILICATE-BASED CEMENTS AND CONCRETES

PRIORITY CLAIMS AND RELATED PATENT APPLICATIONS

This application claims the benefit of priority from U.S. Provisional Application Ser. No. 62/307,315, filed on Mar. 11, 2016, the entire content of which is incorporated herein by reference in its entirety.

FIELD OF THE INVENTION

The invention generally relates to calcium silicate-based cements and concretes. More particularly, the invention relates to novel methods and compositions that prevent or reduce the occurrence of hazing on products made from carbonatable calcium silicate-based cements. The methods and compositions of the invention may be applied in a variety of cement and concrete components in the infrastructure, construction, pavement and landscaping industries.

BACKGROUND OF THE INVENTION

Concrete is the most consumed man-made material in the world. A typical concrete is made by mixing Portland cement, water and aggregates such as sand and crushed stone. Portland cement is a synthetic material made by burning a mixture of ground limestone and clay, or materials of similar composition in a rotary kiln at a sintering temperature of around 1,450° C. Portland cement manufacturing is not only an energy-intensive process, but also one that releases considerable quantities of greenhouse gas ($CO_2$). The cement industry accounts for approximately 5% of global anthropogenic $CO_2$ emissions. More than 60% of such $CO_2$ comes from the chemical decomposition or calcination of limestone.

Recently, a revolutionary form of cement that is based on carbonatable calcium silicate materials has emerged as a promising substitute to traditional cements. Production of carbonatable calcium silicate-based cements involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

Efflorescence is a surface phenomenon of ordinary portland cement (OPC) concrete that contributes to poor aesthetic and long-term durability of concrete. Typically, efflorescence in an OPC system is a family of crystalline products that are comprised of salts of carbonates, sulfates and chlorides. These crystalline products appear as white deposits that form and grow on the surface of concrete products over time. Efflorescence in OPC systems usually arises from carbonates of calcium, sodium and potassium originating from the cement or concrete components. These deposits typically form as soluble calcium hydroxide migrates from the interior of the sample to the outer surface and subsequently reacts with atmospheric $CO_2$ to form calcium carbonate. White deposits can also be formed in the OPC system from the transport and redisposition of soluble salts such as alkali sulfates or chlorides. These white deposits of soluble salts cause hazing.

Carbonatable calcium silicate-based cements generally do not contain or produce $Ca(OH)_2$ under ordinary circumstances. Any easily carbonatable materials within the cement are reacted and thereby passivated during the $CO_2$ curing process. However, other soluble salts, such as alkali sulfates or chlorides, present in the carbonatable calcium silicate cement or contributed from the concrete mixture components can cause hazing. An effective solution is needed to address this unmet challenge.

SUMMARY OF THE INVENTION

The invention provides novel methods and compositions for hazing control in carbonatable calcium silicate-based cements and concretes.

Carbonatable calcium silicate-based compositions are made from widely available, low cost raw materials and can be used in a variety of concrete applications with reduced equipment need, improved energy consumption, and more desirable carbon footprint.

Key features of the invention include: (1) admixtures of readily available components that may be easily metered and can be added to the concrete mixture just before curing, and (2) curing parameter controls that further prevent or reduce hazing.

In one aspect, the invention generally relates to a method for preventing or reducing haze formation on a concrete product. The method includes: prior to curing cement to form a concrete product, adding to the concrete mixture an admixture comprising one or more components capable of reacting with one or more of soluble alkali, alkaline earth, sulfate or chloride ions to form a low solubility material.

In another aspect, the invention generally relates to a method for curing a cement to form a concrete product. The method includes: during the temperature ramping period, changing the temperature of the uncured concrete at a controlled heating rate of not more than 15° C. per hour with concurrent relative humidity of greater than about 70%.

In yet another aspect, the invention generally relates to a carbonatable composition. The carbonatable composition includes: calcium silicate; one or more discrete calcium silicate phases selected from CS (wollastonite or pseudo-wollastonite), C3S2 (rankinite), C2S (belite, larnite, bredigite), and an amorphous calcium silicate phase at about 30% or more by mass of the total phases; and calcium aluminate accounting for about 0.1% to about 2.5% by weight of the carbonatable composition. Elemental Ca and elemental Si are present in the composition at a molar ratio from about 0.8 to about 1.2. Metal oxides of Al, Fe and Mg are present in the composition at about 30% or less by mass. The resulting composition is suitable for carbonation with $CO_2$ at a temperature of about 30° C. to about 90° C. to form $CaCO_3$ with a mass gain of about 10% or more.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
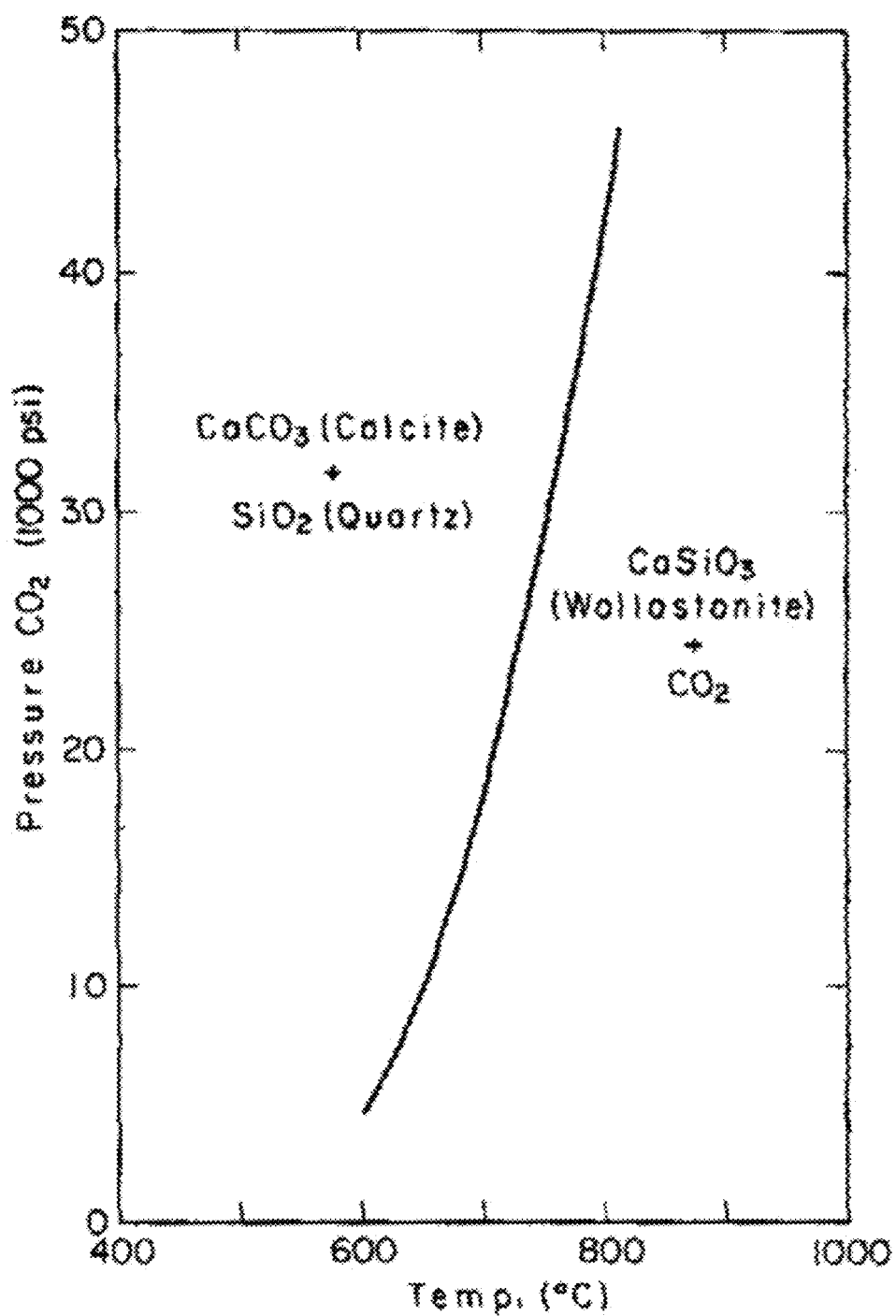
FIG. 1 is a pressure-temperature phase diagram showing the phases present in the reversible reaction $CaCO_3 + SiO_2 \leftrightarrow CaSiO_3$ (calcium silicate) $+ CO_2$.
Figure 2:
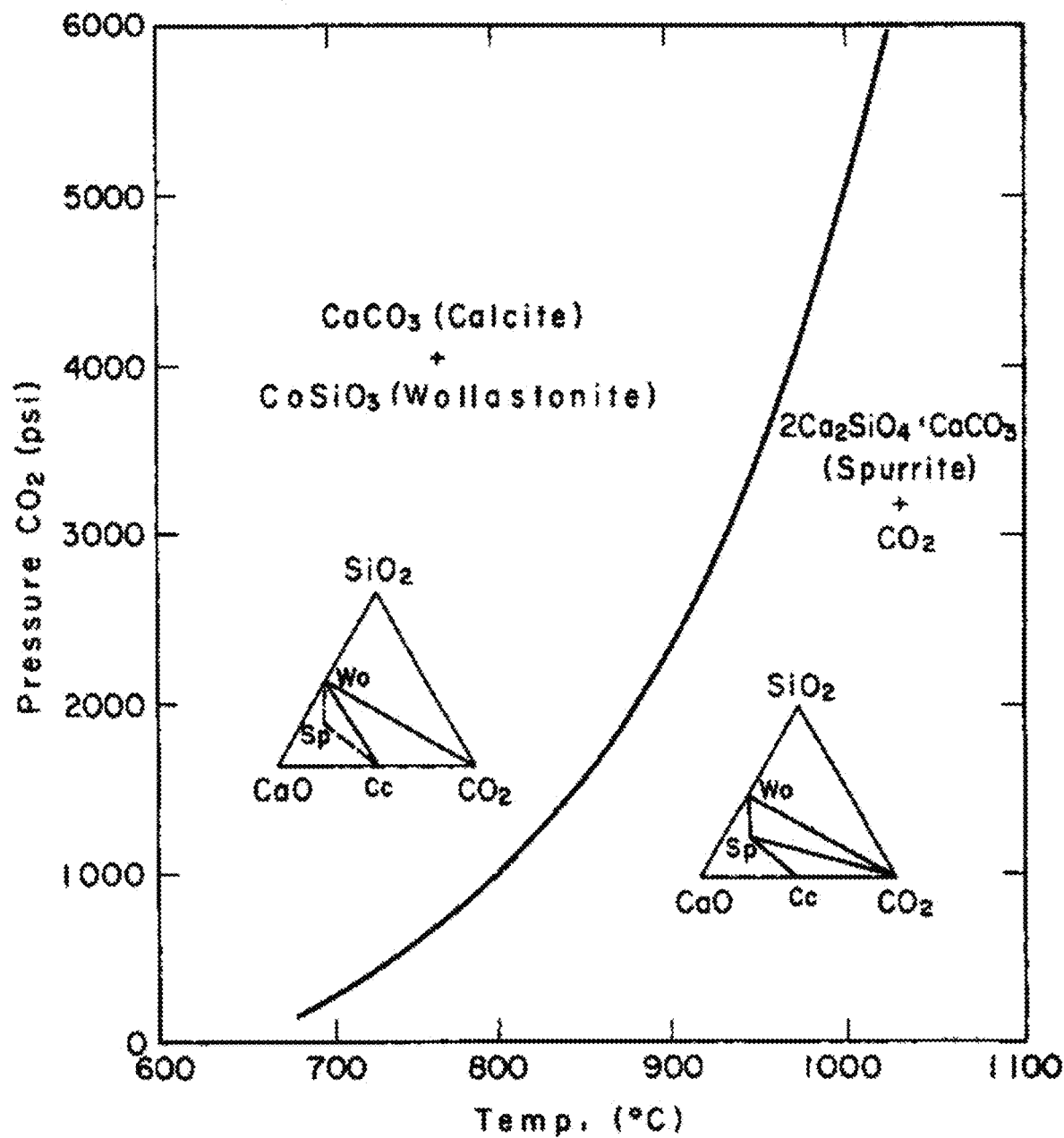
FIG. 2 is a pressure-temperature phase diagram showing the phases present in the reversible reaction $3CaCO_3 + 2CaSiO_3 \leftrightarrow 2Ca_2SiO_4 \cdot CaCO_3 + CO_2$.
Figure 3:
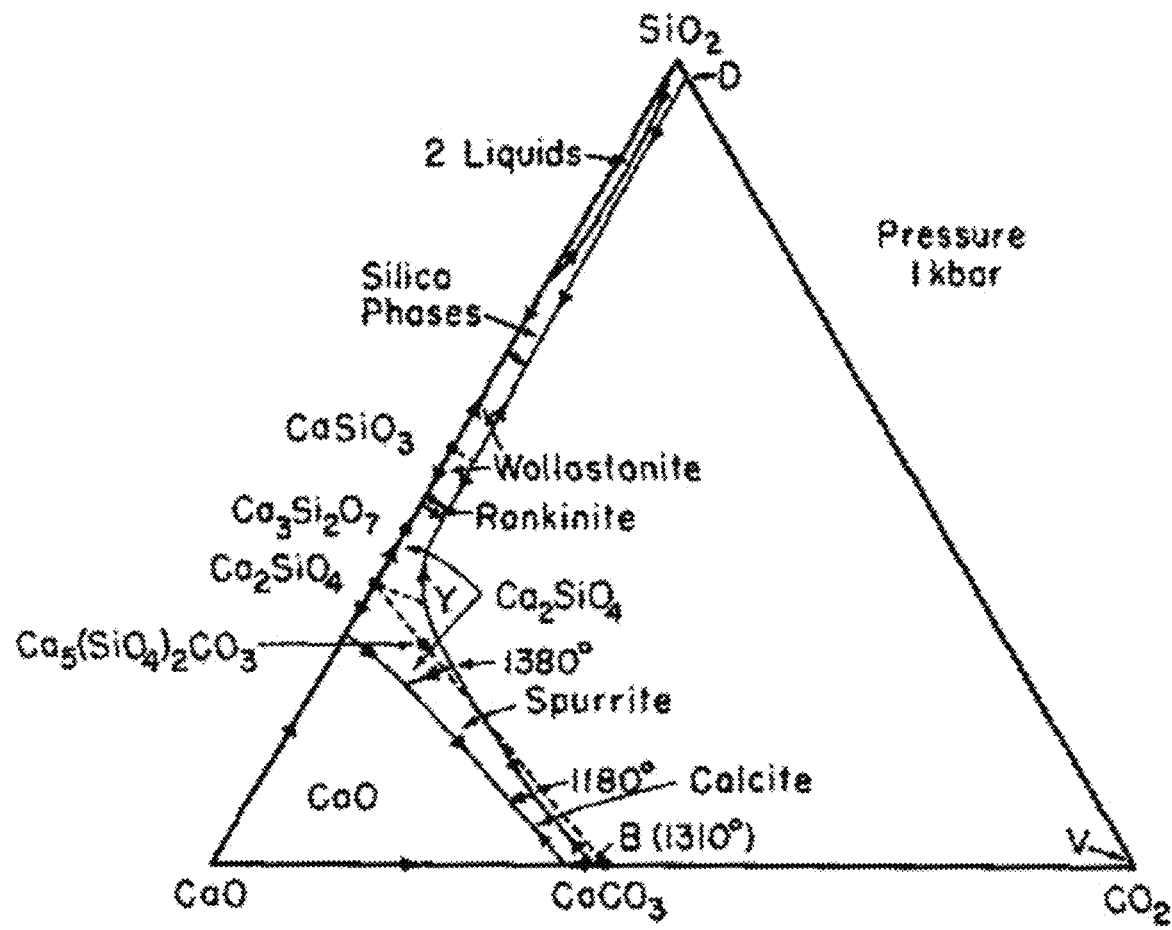
FIG. 3 is a phase diagram of the CaO—SiO$_2$—CO$_2$ system at a pressure of 1 kilobar.
Figure 4:
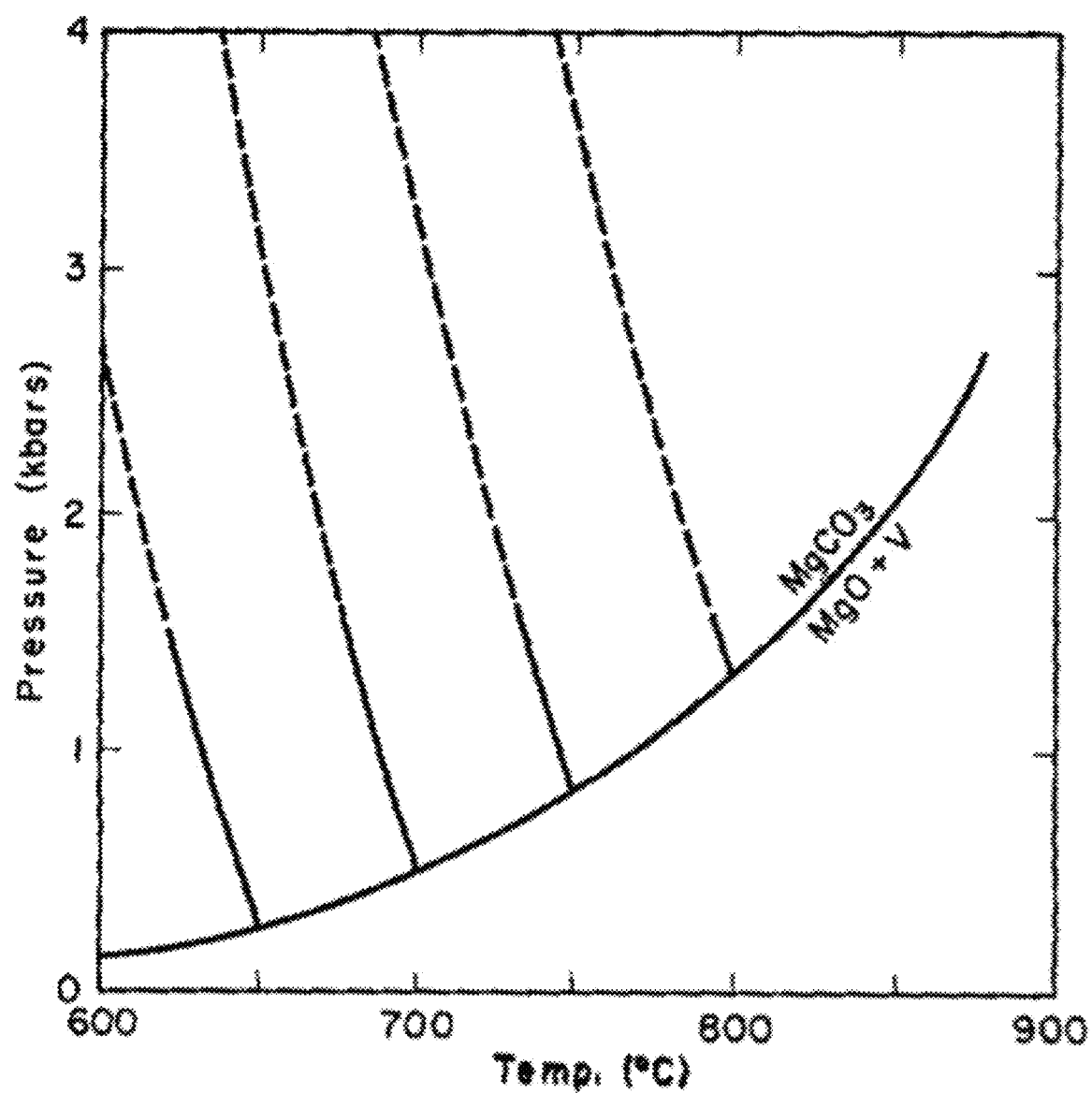
FIG. 4 is a pressure-temperature phase diagram showing the phases present in the reversible reaction MgO+CO$_2$ ↔ MgCO$_3$.
Figure 5:
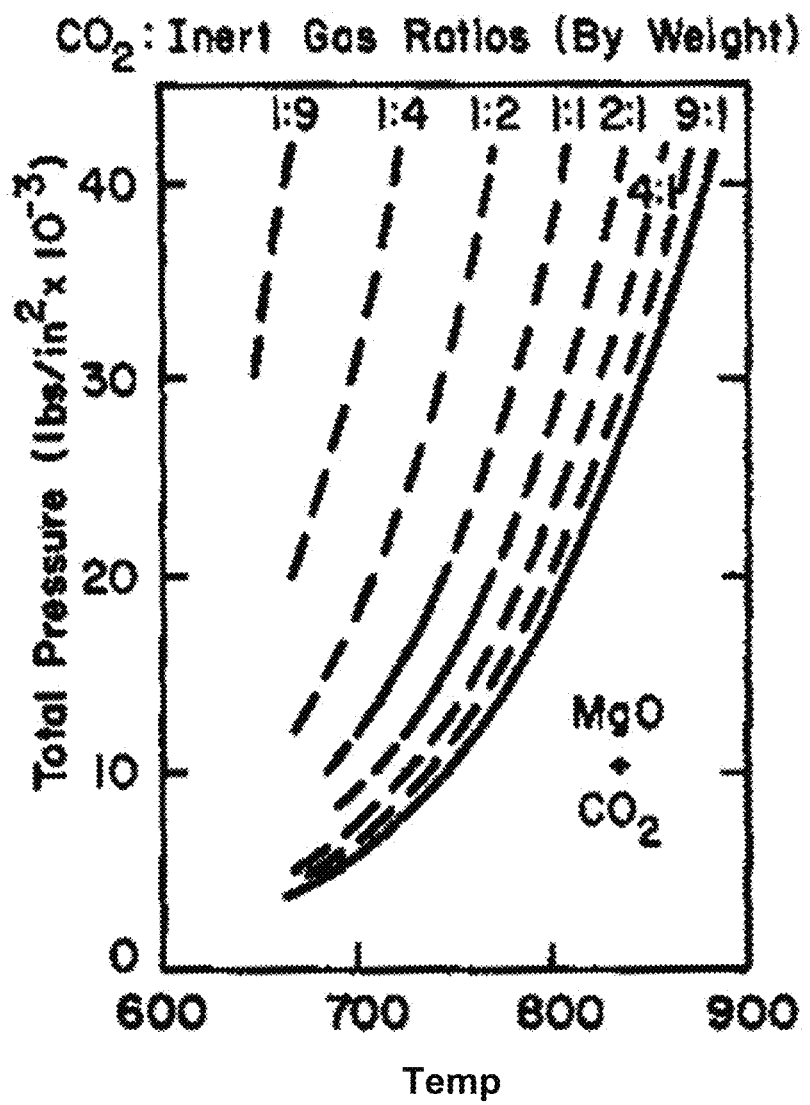
FIG. 5 is a pressure-temperature phase diagram showing the equilibrium curves for the reversible reaction MgO+CO$_2$ ↔ MgCO$_3$ as a function of the proportion of CO$_2$ in an inert gas.
Figure 6:
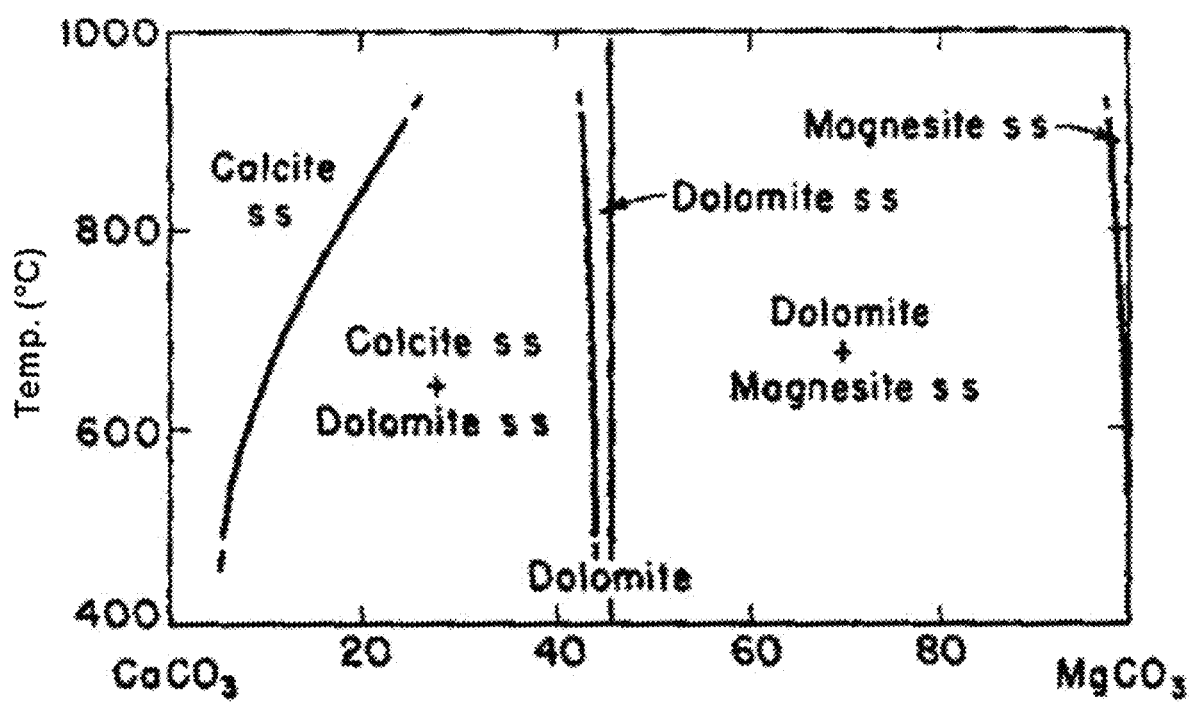
FIG. 6 is a temperature-composition phase diagram that illustrates the stability regions for various phases in the CaCO$_3$—MgCO$_3$ system.
Figure 7:
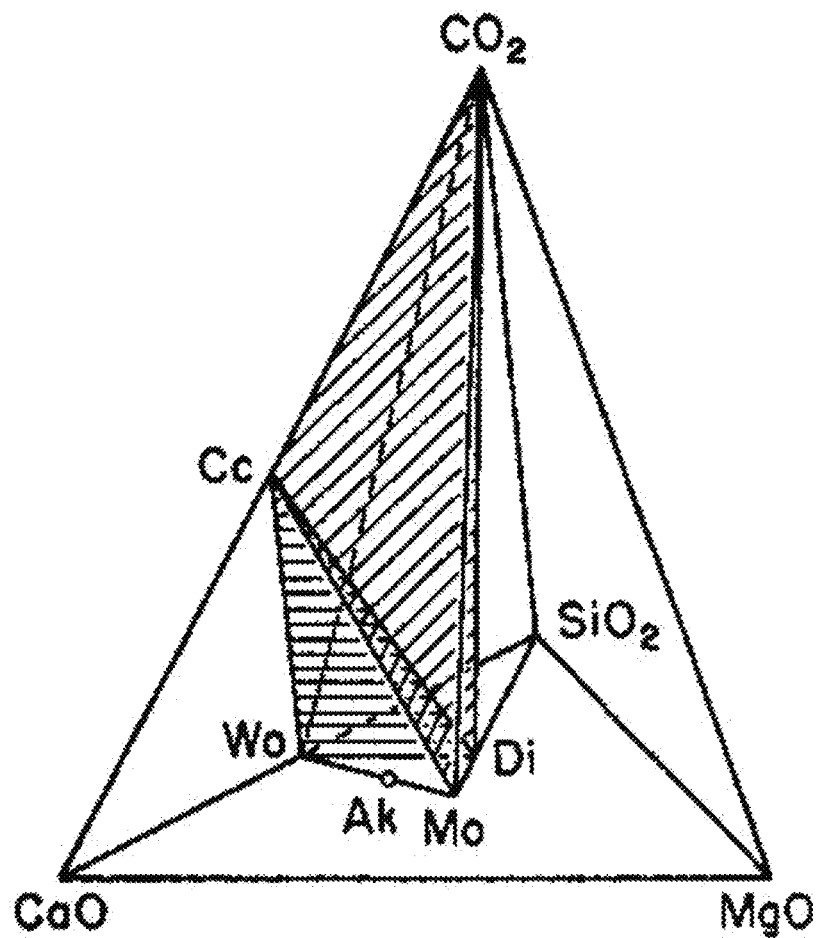
FIG. 7 is a tetrahedron diagram illustrating the phase relationships among the compounds CaO, MgO, SiO$_2$ and CO$_2$, and showing the CO$_2$ deficient region below the Cc-Di-Wo and the Cc-Wo-Mo planes (shaded), where Cc denotes calcite, Wo denotes Wollastonite, Ak denotes Akermanite, Di denotes diopside, and Mo denotes monticellite (CaMgSiO$_4$).
Figure 8:
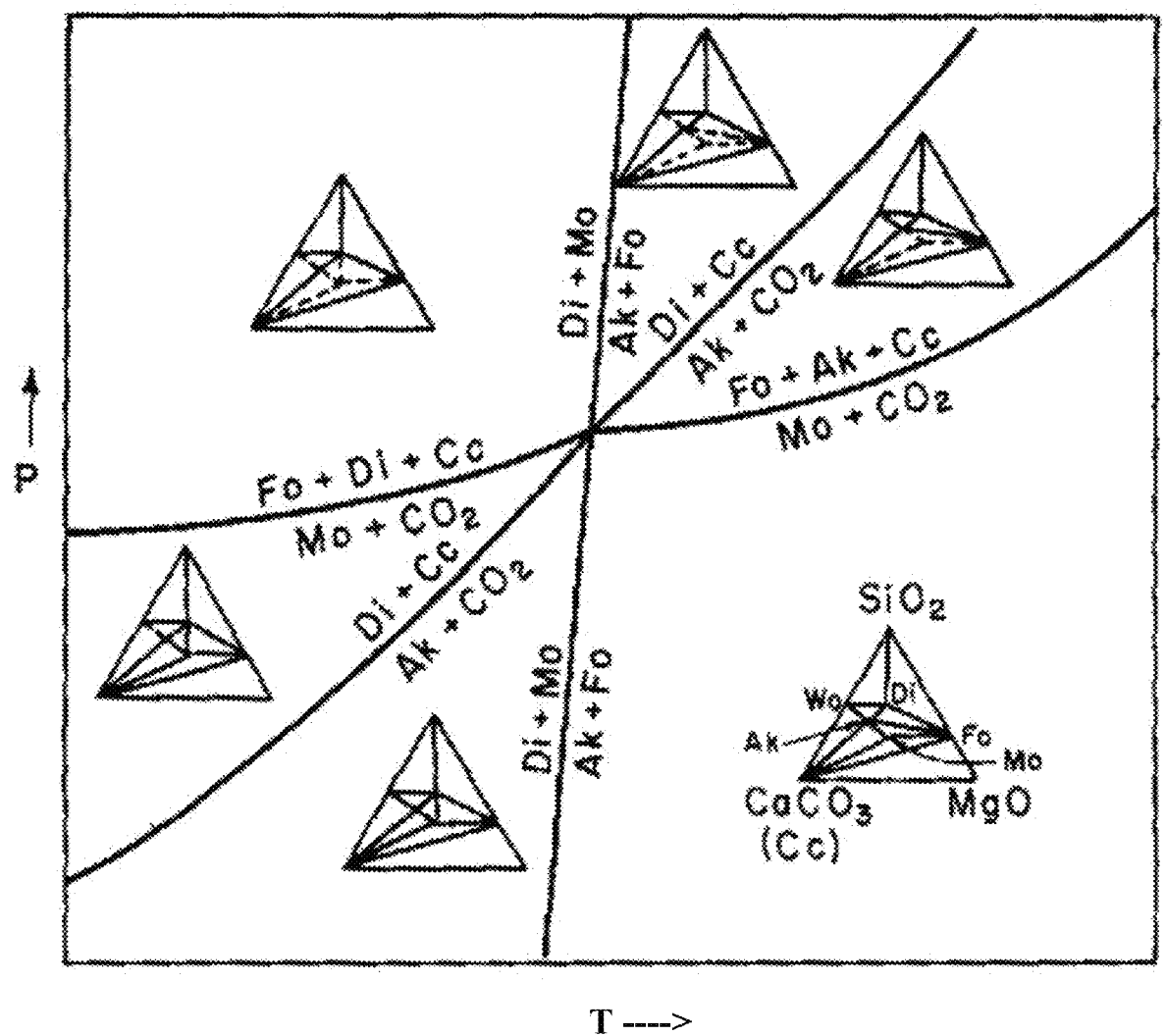
FIG. 8 is a pressure-temperature phase diagram illustrating the phase relationships among the compounds CaO, MgO, SiO$_2$ and CO$_2$, with univariant curves emanating from the quaternary invariant point involving the phases calcite (Cc), diopside (Di), forsterite (Fo), monticellite (Mo), Akermanite (Ak), and CO$_2$. The inset is the phase diagram for the three compound systems of CaCO$_3$, MgO and SiO$_2$.

The invention provides a novel approach to hazing control in carbonatable calcium silicate-based cements and concrete products.

Carbonatable calcium silicate-based cements and concretes are a revolutionary replacement for conventional cement and concrete products. These materials can be produced and utilized with significantly reduced energy requirement and CO$_2$ emissions. The disclosed carbonatable calcium silicate compositions are made from widely available, low cost raw materials by a process suitable for large-scale production with flexible equipment and production requirements. This unique approach is accompanied by a remarkable proficiency for permanently and safely sequestration of CO$_2$. A wide variety of applications can benefit from the invention through improved energy consumption and more desirable carbon footprint, from construction, pavements and landscaping, to infrastructure and transportation.

Carbonatable calcium silicate-based cements contain soluble salts from the cement and concrete mixture components that can cause hazing. The present invention provides a cost-effective solution to prevent and reduce haze formation.

When curing carbonatable calcium silicate-based cements to make concrete products, the transport and evaporation of water is an integral part of the process. A significant quantity of water present in the concrete travels from the interior of the sample to its surface where the water evaporates during the curing process. If the water contains dissolved salts from the cement or concrete components, various degrees of hazing can occur due to transport and precipitation of the salts onto the surface of the product.

The invention encompasses several routes for hazing control for carbonatable calcium silicate-based cement and concrete systems. In a lime deficient system, the most common contributors to haze are potassium and sodium sulfates (K$_2$SO$_4$ and Na$_2$SO$_4$). Potassium and sodium sulfates are both highly soluble salts and thus can easily be transported in an aqueous environment through a porous concrete structure. These salts can precipitate on the surface of the concrete. The methods and compositions of the invention are directed at immobilization of these species prior to or during the carbonation process and, therefore, help prevent or reduce the formation and appearance of haze.

As disclosed herein, it has been unexpectedly discovered that the addition of solid calcium aluminates such as crystalline tricalcium aluminate, monocalcium aluminate or similar amorphous materials to a concrete mix can mitigate or reduce hazing related to soluble sulfate species through the reaction of the solid component and the sulfate. Without wishing to be bound by the theory, calcium and aluminum-containing compounds react with the dissolved SO$_4^{2-}$ to form ettringite (Ca$_6$Al$_2$(SO$_4$)$_3$(OH)$_{12}$.26H$_2$O). This reaction effectively sequesters sulfate ions because ettringite has a significantly lower solubility than unadulterated Na$_2$SO$_4$ or K$_2$SO$_4$, resulting in the immobilization of the soluble salts and prevention or reduction of haze formation.

As disclosed herein, it has also been unexpectedly discovered that the addition of GGBFS, alone or in combination with gypsum, to a concrete mix can provide an effective mechanism to immobilize soluble alkali sulfates, thus mitigating or reducing hazing.

As disclosed herein, it has also been unexpectedly discovered that the addition of fly ash, such as class C fly ash, alone or in combination with gypsum, to a concrete mix can provide an effective mechanism to immobilize soluble alkali sulfates, thus mitigating or reducing hazing.

The invention also provides liquid admixtures that can be added into a concrete mix and can similarly prevent or reduce hazing. Without wishing to be bound by the theory, select soluble calcium ion sources, such as calcium nitrate $Ca(NO_3)_{2(aq)}$ or calcium nitrite $Ca(NO_2)_{2(aq)}$ or calcium chloride $CaCl_{2(aq)}$, can create sparing soluble precipitates such as $CaSO_4.2H_2O$ and thereby immobilize haze-producing sulfates. In some cases, liquid admixtures may also work by complexing ions and preventing their precipitation all together.

As disclosed herein, it has also been unexpectedly discovered that the addition of soluble aluminum salts, such as aluminum nitrate or aluminum chloride, in combination with tartaric acid can provide an effective mechanism to immobilize soluble alkali sulfates, thus mitigating or reducing hazing.

To provide a further dimension for controlling and reducing hazing, the invention provides specific and adjustable drying and curing conditions for processing concrete bodies that can also prevent or reduce haze. The curing methods of the invention allow control of the evaporation and hence water transport rate to the concrete surface. This is achieved by employing mild temperature or temperature ramp rates while simultaneously maintaining a high relative humidity to effectively slow the transport of haze producing species to the concrete surface.

Thus, in one aspect, the invention generally relates to a method for preventing or reducing haze formation on a concrete product. The method includes: prior to curing cement to form a concrete product, adding to the concrete mixture an admixture including one or more components capable of reacting with one or more of soluble alkali, alkaline earth, sulfate or chloride ions to form a low solubility material.

In certain embodiments, the method further includes: curing the cement to form a concrete product.

In certain embodiments of the method, adding to cement an admixture comprises adding a solid admixture. In certain embodiments of the method, adding to cement an admixture comprises adding a liquid admixture. In certain embodiments of the method, adding to cement an admixture comprises adding a solid admixture and a liquid admixture.

In certain embodiments of the method, the cement is a carbonatable calcium silicate-based cement. In certain embodiments of the method, the carbonatable calcium silicate-based cement comprises calcium silicate and one or more discrete calcium silicate phases selected from CS (wollastonite or pseudowollastonite), C3S2 (rankinite), C2S (belite, larnite, bredigite), and an amorphous calcium silicate phase at about 30% or more by mass of the total phases.

In certain preferred embodiments, the molar ratio of Ca to Si of the composition is from about 0.85 to about 1.15. In certain preferred embodiments, the molar ratio of Ca to Si of the composition is from about 0.90 to about 1.10. In certain preferred embodiments, the molar ratio of Ca to Si of the composition is from about 0.95 to about 1.05. In certain preferred embodiments, the molar ratio of Ca to Si of the composition is from about 0.98 to about 1.02. In certain preferred embodiments, the molar ratio of Ca to Si of the composition is from about 0.99 to about 1.01.

The metal oxides of Al, Fe and Mg contained within the calcium silicate composition are generally controlled to be less than about 30%. In certain preferred embodiments, the composition has about 20% or less of metal oxides of Al, Fe and Mg by total oxide mass. In certain preferred embodiments, the composition has about 15% or less of metal oxides of Al, Fe and Mg by total oxide mass. In certain preferred embodiments, the composition has about 12% or less of metal oxides of Al, Fe and Mg by total oxide mass. In certain preferred embodiments, the composition has about 10% or less of metal oxides of Al, Fe and Mg by total oxide mass. In certain preferred embodiments, the composition has about 5% or less of metal oxides of Al, Fe and Mg by total oxide mass.

In certain embodiments of the method, the solid admixture includes one or more selected from calcium aluminate and calcium sulfoaluminate.

In certain embodiments of the method, the solid admixture includes one or more selected from calcium aluminate and calcium sulfoaluminate with addition of small amount of calcium hydroxide $(Ca(OH)_2)$.

In certain embodiments of the method, the solid admixture includes one or more selected from GGBFS and Class C Fly Ash. In certain embodiments, the admixture of GGBFS and/or Fly Ash accounts for from about 1% to about 25% by weight of the cement mixture (e.g., from about 1% to about 20%, from about 1% to about 20%, from about 1% to about 15%, from about 1% to about 10%, from about 1% to about 5%, from about 5% to about 25%, from about 10% to about 25%, from about 15% to about 25%, from about 5% to about 20%).

Figure 15:
FIG. 15 Carbonatable calcium silicate cement concrete pavers with no additive (left) compared to similar samples with 15 wt. % ground granulated blast furnace slag (GGBFS) and 1 wt. % gypsum (right). With the addition of GGBFS and gypsum, the appearance of haze was eliminated.

In certain embodiments of the method, the solid admixture includes one or more selected from GGBFS and Class C Fly Ash with the addition of a small amount (e.g., from 0.1% to about 2%, from 0.5% to about 1.5%, from 0.8% to about 1.2% by weight of the cement mixture) of gypsum $(CaSO_4.2H_2O)$ as demonstrated in FIG. 15. In certain embodiments, the admixture of GGBFS and/or Fly Ash accounts with a small amount of gypsum for from about 1% to about 25% by weight of the cement mixture (e.g., from about 1% to about 20%, from about 1% to about 20%, from about 1% to about 15%, from about 1% to about 10%, from about 1% to about 5%, from about 5% to about 25%, from about 10% to about 25%, from about 15% to about 25%, from about 5% to about 20%).

In certain embodiments of the method, the solid admixture includes calcium aluminate and is added to the cement mix in an amount such that calcium aluminate accounts for about 0.1% to about 10% (e.g., from about 0.5% to about 10%, from about 1% to about 10%, from about 2% to about 10%, from about 3% to about 10%, from about 5% to about 10%, from about 0.1% to about 5%, from about 0.1% to about 3%, from about 0.1% to about 2%, from about 0.1% to about 1.0%, from about 1% to about 8%, from about 2% to about 5%) by weight of the cement mixture.

In certain embodiments, the solid admixture includes calcium aluminate, which accounts for about 0.1% to about 1.0% by weight of the cement mixture. In certain embodiments, calcium aluminate accounts for about 1.0% to about 10% by weight of the cement mixture.

In certain embodiments, the solid admixture includes calcium sulfoaluminate, which accounts for about 0.1% to about 1.0% by weight of the cement mixture. In certain embodiments, calcium sulfoaluminate accounts for about 0.1% to about 1.0% by weight of the cement mixture.

In certain embodiments of the method, the liquid admixture is an aqueous solution including one or more highly soluble calcium salts. In certain embodiments of the method, the highly soluble calcium is selected from calcium nitrate, calcium nitrite, and calcium chloride.

In certain embodiments of the method, the liquid admixture is an aqueous solution including calcium nitrite. In certain embodiments of the method, the liquid admixture is an aqueous solution including calcium chloride.

In certain embodiments of the method, the liquid admixture is an aqueous solution including one or more highly soluble aluminum salts.

In certain embodiments of the method, the highly soluble aluminum salt is selected from aluminum nitrate and aluminum nitrate nonahydrate. In certain embodiments of the method, the highly soluble aluminum salt is present in combination with tartaric acid ($C_4H_6O_{6(aq)}$) as demonstrated in FIG. 16. In certain embodiments of the method, the liquid admixture is an aqueous solution of aluminum nitrate and tartaric acid. In certain embodiments of the method, the liquid admixture is an aqueous solution of aluminum nitrate nonahydrate and tartaric acid.

In certain embodiments of the method, the liquid admixture comprises calcium nitrate, calcium nitrite and/or calcium chloride and is added to the cement at about 0.5 g to about 30 g (e.g., from about 0.5 g to about 20 g, from about 0.5 g to about 15 g, from about 0.5 g to about 10 g, from about 0.5 g to about 5 g, about 1 g to about 30 g, about 5 g to about 30 g, about 10 g to about 30 g, about 15 g to about 30 g, about 1 g to about 20 g, about 3 g to about 15 g, about 5 g to about 10 g) calcium nitrate, calcium nitrite and/or calcium chloride per kg of cement.

In certain embodiments of the method, the liquid admixture comprises aluminum nitrate and/or aluminum nitrate nonahydrate and is added to the cement at about 0.5 g to about 30 g (e.g., from about 0.5 g to about 20 g, from about 0.5 g to about 15 g, from about 0.5 g to about 10 g, from about 0.5 g to about 5 g, about 1 g to about 30 g, about 5 g to about 30 g, about 10 g to about 30 g, about 15 g to about 30 g, about 1 g to about 20 g, about 3 g to about 15 g, about 5 g to about 10 g) aluminum nitrate and/or aluminum nitrate nonahydrate per kg of cement.

In certain embodiments of the method, the aqueous solution including calcium nitrate, calcium nitrite and/or calcium chloride at about 5% to about 50% (e.g., from about 5% to about 40%, from about 5% to about 30%, from about 5% to about 20%, from about 5% to about 10%, from about 10% to about 50%, from about 20% to about 50%, from about 30% to about 50%, from about 10% to about 40%, from about 15% to about 30%) by weight.

In certain embodiments of the method, the aqueous solution including aluminum nitrate and/or aluminum nitrate nonahydrate at about 5% to about 50% (e.g., from about 5% to about 40%, from about 5% to about 30%, from about 5% to about 20%, from about 5% to about 10%, from about 10% to about 50%, from about 20% to about 50%, from about 30% to about 50%, from about 10% to about 40%, from about 15% to about 30%) by weight.

In certain embodiments of the method, the liquid admixture is an aqueous solution including aluminum nitrate at about 0.1% to about 3.0% by weight of cement in the concrete mixture and tartaric acid at about 0.1% to about 3.0% by weight of cement. In certain embodiments of the method, the liquid admixture is an aqueous solution including aluminum nitrate at about 0.5% to about 2.0% by weight of cement in the concrete mixture and tartaric acid at about 0.5% to about 2.0% by weight of cement. In certain embodiments of the method, the liquid admixture is an aqueous solution including aluminum nitrate at about 0.5% to about 1.5% by weight of cement in the concrete mixture and tartaric acid at about 1.0% to about 2.0% by weight of cement. In certain embodiments of the method, the liquid admixture is an aqueous solution including aluminum nitrate at about 0.8% to about 1.2% by weight of cement in the concrete mixture and tartaric acid at about 1.3% to about 1.7% by weight of cement.

In certain embodiments, the alkali, alkaline earth, sulfate or chloride ions are selected from $Ca^{2+}$, $Na^+$, $K^+$, $Mg^{2+}$, Cr, and $SO_3^{2-}$ ions.

In certain embodiments, during the temperature ramping period, changing the temperature of concrete at a controlled heating rate of not more than 15° C. per hour with concurrent relative humidity of greater than about 70%. In certain embodiments, the temperature of concrete is changed at a controlled heating rate of not more than 12° C. per hour with concurrent relative humidity of greater than about 80%. In certain embodiments, the temperature of concrete is changed at a controlled heating rate of not more than 8° C. per hour with concurrent relative humidity of greater than about 90%.

In certain embodiments of the method, curing is by $CO_2$ at a temperature of about 50° C. to about 70° C.

Outcomes of the method depend on the components and actual amounts of the admixtures used. The most preferred outcomes include prevention of haze formation. Preferred outcomes include substantial mitigation or reduction of haze formation (e.g., a 90% reduction, a 80% reduction, a 70% reduction, a 60% reduction, a 50% to 90% reduction, a 40% to 80% reduction) as compared to not using the admixture.

In another aspect, the invention generally relates to a method for curing a cement to form a concrete product. The method includes: during the temperature ramping period, changing the temperature of uncured concrete at a controlled heating rate of not more than 15° C. per hour with concurrent relative humidity of greater than about 70%.

In certain embodiments, the cement is a carbonatable calcium silicate-based cement. In certain embodiments, the carbonatable calcium silicate-based cement includes calcium silicate and one or more discrete calcium silicate phases selected from CS (wollastonite or pseudowollastonite), C3S2 (rankinite), C2S (belite, larnite, bredigite), and an amorphous calcium silicate phase at about 30% or more (e.g., about 35% or more, about 40% or more, about 45% or more) by mass of the total phases.

In certain embodiments, the temperature of uncured concrete is changed at a controlled heating rate of not more than 12° C. per hour with concurrent relative humidity of greater than about 80%. In certain embodiments, the temperature of uncured concrete is changed at a controlled heating rate of not more than 8° C. per hour with concurrent relative humidity of greater than about 90%.

In yet another aspect, the invention generally relates to a carbonatable composition. The carbonatable composition includes: calcium silicate; one or more discrete calcium silicate phases selected from CS (wollastonite or pseudo-wollastonite), C3S2 (rankinite), C2S (belite, larnite, bredigite), and an amorphous calcium silicate phase at about 30% or more by mass of the total phases; and calcium aluminate accounting for about 0.1% to about 2.5% by weight of the carbonatable composition. Elemental Ca and elemental Si are present in the composition at a molar ratio from about 0.8 to about 1.2; and metal oxides of Al, Fe and Mg are present in the composition at about 30% or less by mass. The composition is suitable for carbonation with $CO_2$ at a temperature of about 30° C. to about 90° C. to form $CaCO_3$ with a mass gain of about 10% or more.

Calcium silicate compositions may contain amorphous (non-crystalline) calcium silicate phases in addition to the crystalline phases described above. The amorphous phase may additionally incorporate Al, Fe and Mg ions and other impurity ions present in the raw materials.

The calcium silicate compositions may also include small quantities of residual CaO (lime) and $SiO_2$ (silica). The calcium silicate composition may also include small quantities of C3S (alite, $Ca_3SiO_5$).

The C2S phase present within the calcium silicate composition may exist in any $\alpha\text{-}Ca_2SiO_4$, $\beta\text{-}Ca_2SiO_4$ or $\gamma\text{-}Ca_2SiO_4$ polymorph or combination thereof.

The calcium silicate compositions may also include quantities of inert phases such as melilite type minerals (melilite or gehlenite or akermanite) with the general formula $(Ca, Na, K)_2[(Mg, Fe^{2+}, Fe^{3+}, Al, Si)_3O_7]$ and ferrite type minerals (ferrite or brownmillerite or C4AF) with the general formula $Ca_2(Al, Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

In certain embodiments, the carbonatable composition includes the reactive phases that are present at about 50% or more (e.g., about 55% or more, about 60% or more, about 65% or more, about 70% or more, about 75% or more, about 80% or more, about 85% or more, about 90% or more, about 95% or more) by mass.

In certain embodiments, the carbonatable composition includes about 20% or less of metal oxides of Al, Fe and Mg by total oxide mass.

Any suitable calcium silicate composition may be used as a precursor for the bonding elements. As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO.SiO_2$), C3S2 (rankinite, and sometimes formulated as $Ca_3Si_2O_7$ or $3CaO.2SiO_2$), C2S (belite, $\beta\text{-}Ca_2SiO_4$ or larnite, $\beta\text{-}Ca_7Mg(SiO_4)$ or bredigite, $\alpha\text{-}Ca_2SiO_4$ or $\gamma\text{-}Ca_2SiO_4$, and sometimes formulated as $Ca_2SiO_4$ or $2CaO.SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It is noted that preferably the carbonatable calcium silicate compositions of the invention do not hydrate. However, minor amounts of hydratable calcium silicate phases (e.g., C2S, C3S and CaO) may be present. C2S exhibits slow kinitecs of hydration when exposed to water and is quickly converted to $CaCO_3$ during $CO_2$ curing processes. C3S and CaO hydrate quickly upon exposure to water and thus should be limited to <5% by mass.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "fosterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

A major utility of the carbonatable composition is that it can be carbonated to form composite materials that are useful in a variety of application. The carbonation, for example, may be carried out reacting it with $CO_2$ via a controlled Hydrothermal Liquid Phase Sintering (HLPS) process to create bonding elements that hold together the various components of the composite material. For example in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS and related topics can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. patent application Ser. Nos. 14/207,920, 14/209,238, filed Mar. 13, 2014, U.S. Pub. No. 2014/0363665 (application Ser. No. 14/295,601), U.S. Pub. No. 2014/0361471 (application Ser. No. 14/295,402), U.S. Pub. No. 2016/0355439 (application Ser. No. 14/506,079), U.S. Pub. No. 2015/0225295 (application. Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074,692), application Ser. No. 15/290,328, filed Oct. 11, 2016, each of which is expressly incorporated herein by reference in its entirety for all purposes.

Figure 9:
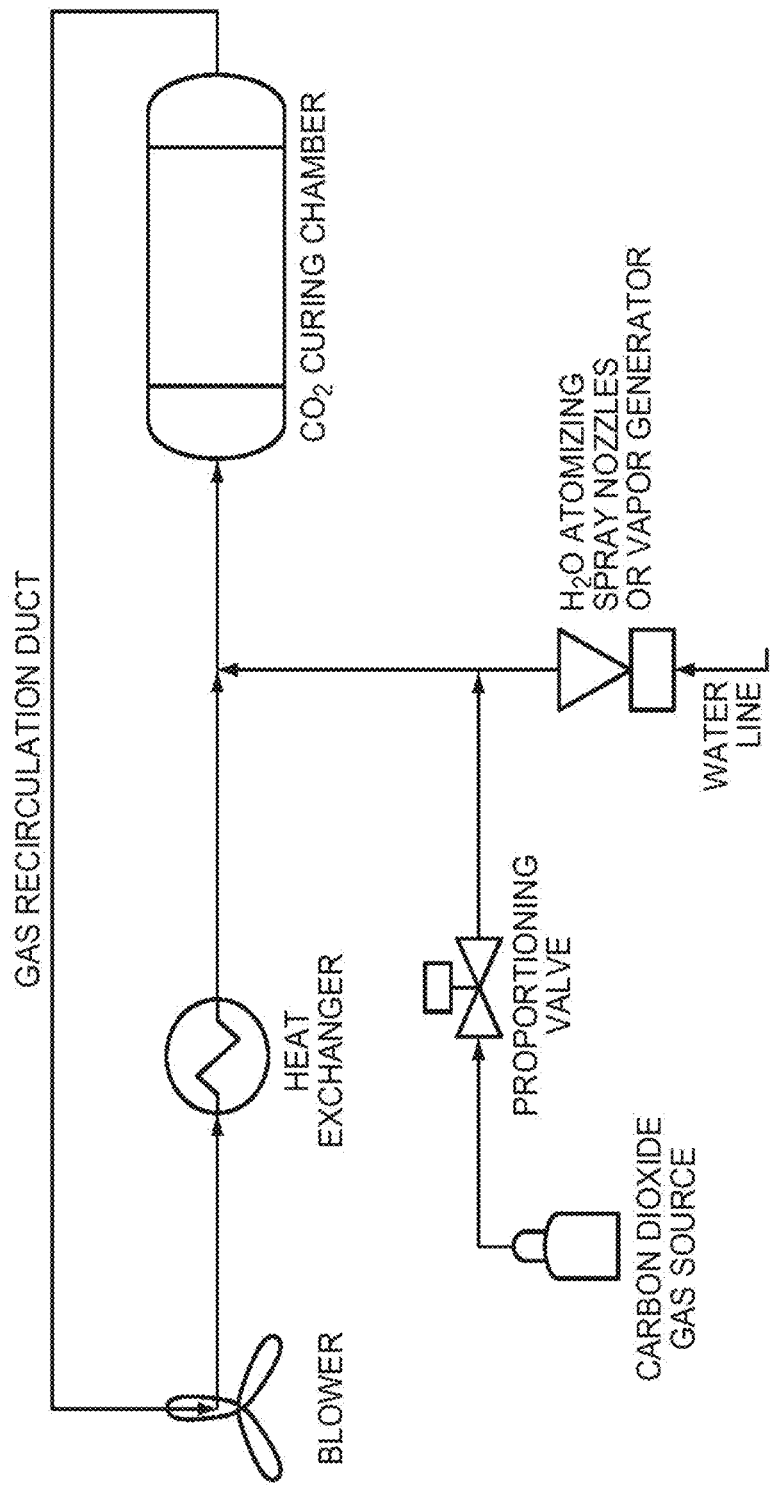
FIG. 9 is a schematic diagram of a CO$_2$ composite material curing chamber that provides humidification according to principles of the invention.
Figure 10:
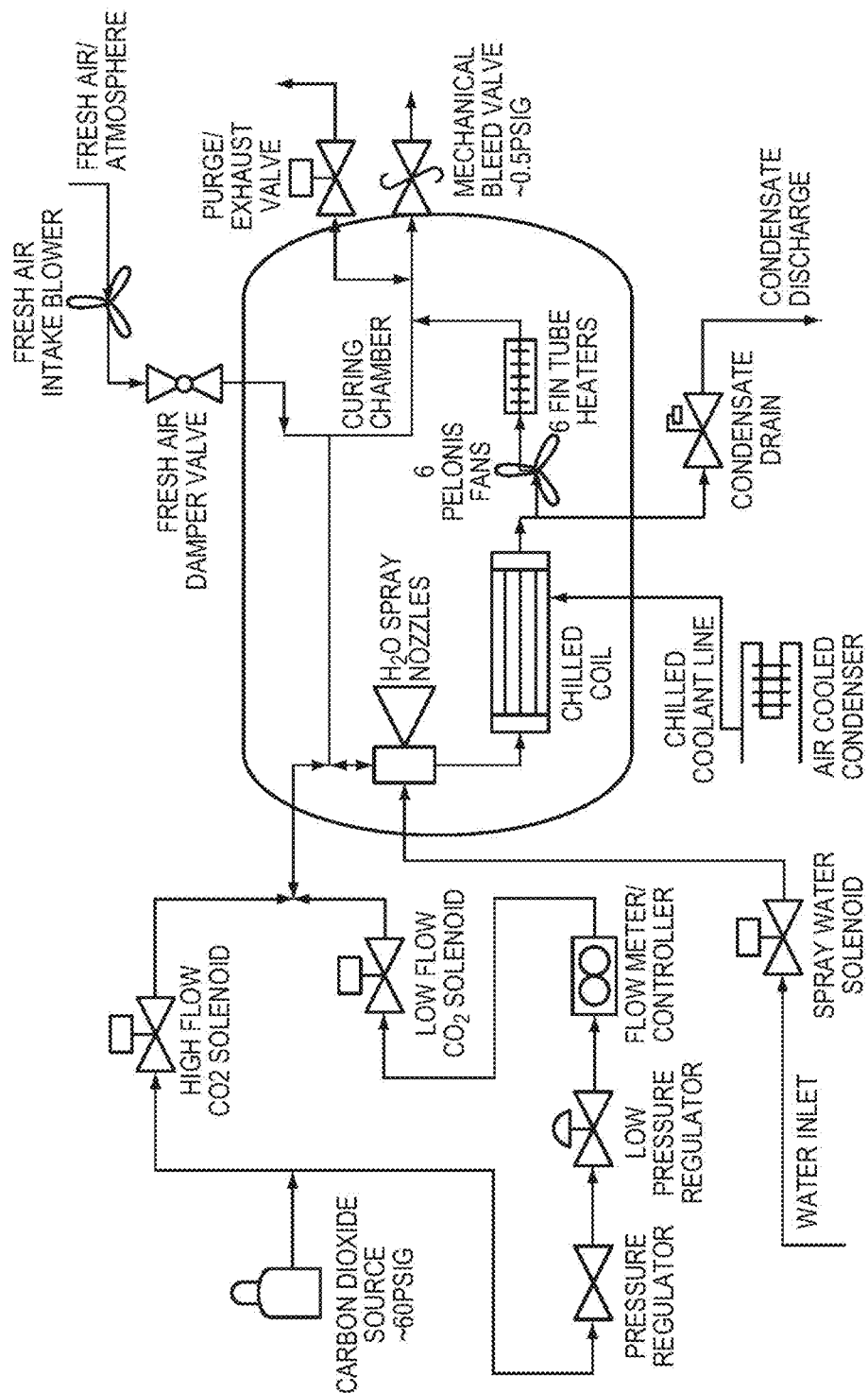
FIG. 10 is a schematic diagram of a curing chamber with multiple methods of humidity control as well as ability to control and replenish CO$_2$ using constant flow or pressure regulation and that can control the temperature according to principles of the invention.

FIG. 1 through FIG. 8 are phase diagrams that show various phase interrelationships among some of the materials described. FIG. 9 is a schematic diagram of a $CO_2$ composite material curing chamber that provides humidification according to principles of the invention. In FIG. 9, a water supply is provided and water vapor is added to the atmosphere that is circulating within the curing chamber. FIG. 10 is a schematic diagram of a curing chamber with multiple methods of humidity control as well as ability to control and replenish $CO_2$ using constant flow or pressure regulation and that can control the temperature according to principles of the invention. This system is an example of a system that can provide closed loop control or control using feedback, in which set values of operating parameters such as $CO_2$ concentration, humidity, and temperature that are desired at specific times in the process cycle are provided, and measurements are taken to see whether the actual value of the parameter being controlled is the desired value.

In exemplary embodiments of carbonation of the composition of the invention, ground calcium silicate composition is used. The ground calcium silicate composition may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 $m^2$/kg to about 700 $m^2$/kg (e.g., 150 $m^2$/kg, 200 $m^2$/kg, 250 $m^2$/kg, 300 $m^2$/kg, 350 $m^2$/kg, 400 $m^2$/kg, 450 $m^2$/kg, 500 $m^2$/kg, 550 m2/kg, 600 m2/kg, 650 m2/kg, 700 m2/kg).

Any suitable aggregates may be used to form composite materials from the carbonatable composition of the invention, for example, calcium oxide-containing or silica-containing materials. Exemplary aggregates include inert materials such as trap rock, construction sand, pea-gravel. In certain preferred embodiments, lightweight aggregates such as perlite or vermiculite may also be used as aggregates. Materials such as industrial waste materials (e.g., fly ash, slag, silica fume) may also be used as fine fillers.

The plurality of aggregates may have any suitable mean particle size and size distribution. In certain embodiments, the plurality of aggregates has a mean particle size in the range from about 0.25 mm to about 25 mm (e.g., about 5 mm to about 20 mm, about 5 mm to about 18 mm, about 5 mm to about 15 mm, about 5 mm to about 12 mm, about 7 mm to about 20 mm, about 10 mm to about 20 mm, about ⅛", about ¼", about ⅜", about ½", about ¾").

Other chemical admixtures may also be included in the composite material; for example, plasticizers, retarders, accelerators, dispersants and other rheology-modifying agents. Certain commercially available chemical admixtures such as Glenium™ 7500 by BASF® Chemicals and Acumer™ by Dow Chemical Company may also be included. In certain embodiments, one or more pigments may be evenly dispersed or substantially unevenly dispersed in the bonding matrices, depending on the desired composite material. The pigment may be any suitable pigment including, for example, oxides of various metals (e.g., black iron oxide, cobalt oxide and chromium oxide). The pigment may be of any color or colors, for example, selected from black, white, blue, gray, pink, green, red, yellow and brown. The pigment may be present in any suitable amount depending on the desired composite material, for example in an amount ranging from about 0.0% to about 10% by weight.

A variety of composite products can be produced from the carbonatable calcium silicate compositions of the invention by a process that does not require autoclave(s) and is suitable for continuous, large-scale production. The production methods are much improved over conventional pervious concretes in terms of both economics and environmental impact.

Examples

Figure 11:
FIG. 11 Photo showing formation of haze on the surface of pavers.
Figure 12:
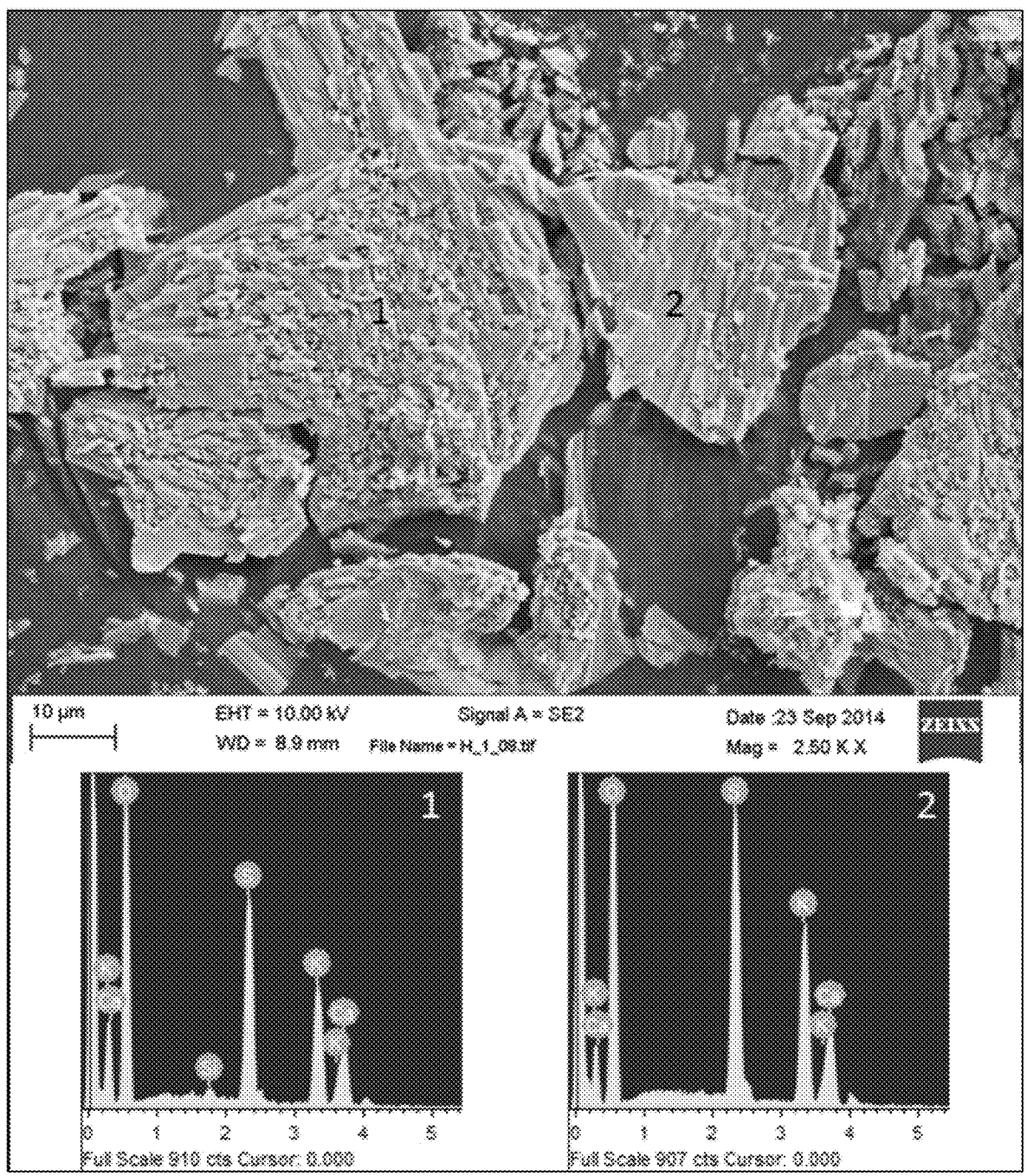
FIG. 12 SEM Analysis of haze deposits sampled from the surface of a carbonatable calcium silicate cement concrete. EDS indicates the presence of Ca, K, S, and O species FIG. 13 Carbonatable calcium silicate cement concrete pavers with no additive (top) compared to similar samples with calcium aluminate replacement of cement (bottom). By replacing 0.5% of the cement with solid powdered calcium aluminate (SC-1) the appearance of haze was eliminated.

Hazing in carbonatable calcium silicate cement concretes manifests in the appearance of white deposits on the surface of the concrete members. The deposits can appear after $CO_2$ curing as discrete spots, or uniformly across the surface resulting in a light or whitewashed appearance. A carbonatable calcium silicate concrete paver was prepared and subjected to $CO_2$ curing. The product exhibited white deposits after curing. Various degrees of the white deposits on the concrete surfaces are shown in FIG. 11. The deposits were sampled with conductive carbon tape and imaged in a Scanning Electron Microscope (SEM). Morphological and energy-dispersive spectroscopy (EDS) analysis of the deposits indicated that they were largely comprised of $K_2SO_4.nH_2O$, $CaSO_4.nH_2O$, or $K_2Ca(SO_4)_2.H_2O$. The SEM and EDS results are shown in FIG. 12.

Figure 13:
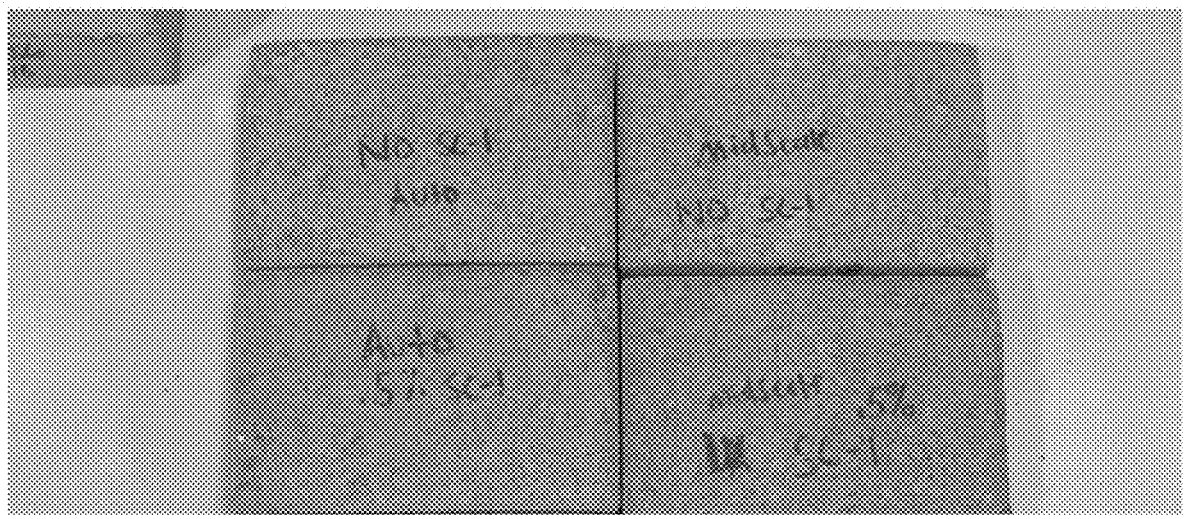

A carbonatable calcium silicate cement concrete formulation (Formulation 1) known to exhibit hazing was prepared. In parallel, a similar formulation (Formulation 2) was prepared with 0.5% mass of the total cement content replaced with powdered calcium aluminate. The concretes were then reacted in $CO_2$ curing chambers and examined to determine the extent of haze formation (FIG. 13). These observations indicate that the use of 0.5% mass replacement of cement by powdered calcium aluminate in Formulation 2 eliminated the appearance of haze.

Figure 14:
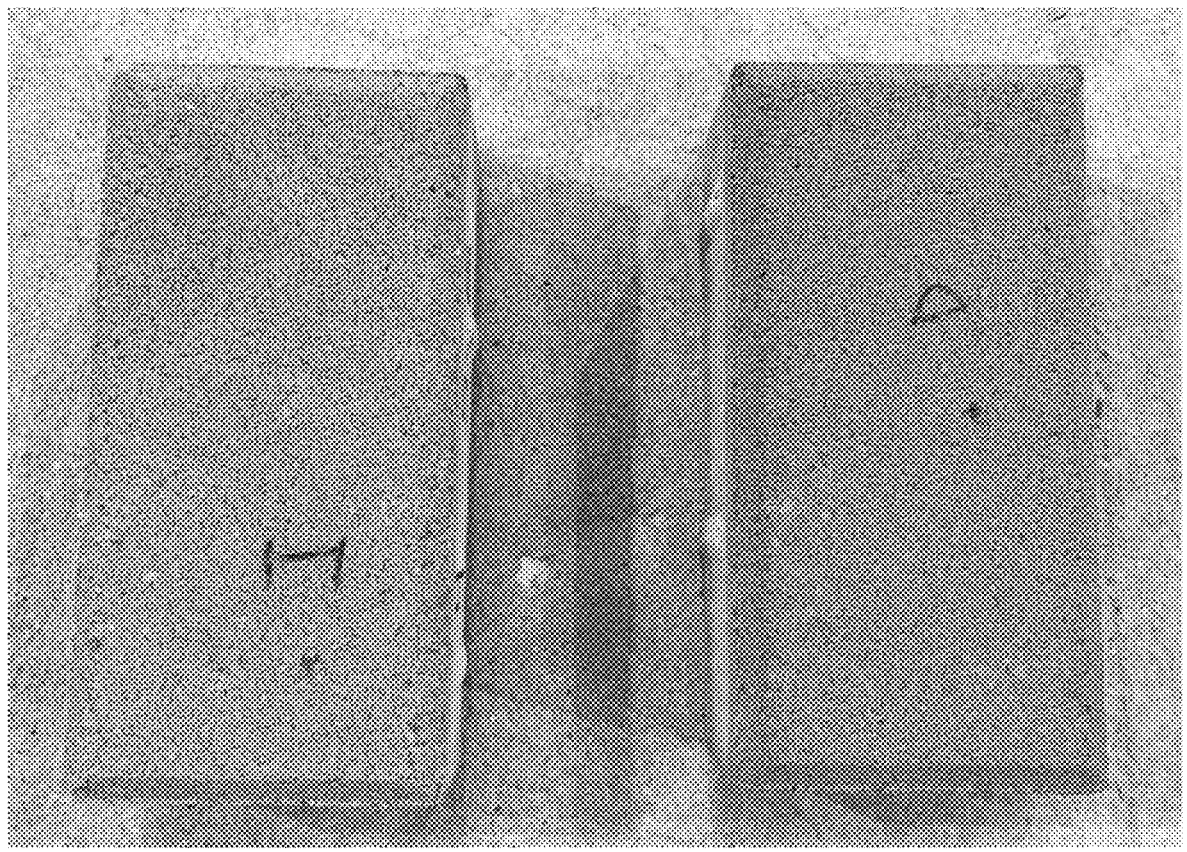
FIG. 14 Carbonatable calcium silicate cement concrete pavers with no additive (left) compared to similar samples with a Ca(NO$_3$)$_2$ admixture included (right). By adding a 30% Ca(NO$_3$)$_2$ solution to the paver with a dosage of 20 ml per kg of cement the appearance of haze was eliminated.

A carbonatable calcium silicate cement concrete formulation (Formulation 3) known to exhibit hazing was prepared. In parallel, a similar formulation (Formulation 4) was prepared with the addition of 30% $Ca(NO_3)_2$ solution with a dosage of 20 ml per kg of cement. The concretes were then reacted with a $CO_2$ curing process and examined to determine the extent of haze formation (FIG. 14). These observations indicate that the use of 30% $Ca(NO_3)_2$ solution at a dosage of 20 ml per kg of cement in Formulation 3 eliminated the appearance of haze.

A carbonatable calcium silicate cement concrete formulation was prepared with the addition of 15% GGBFS by weight of cement in combination with 1% gypsum ($CaSO_4.2H_2O$) by weight of cement. The concrete samples were reacted with a $CO_2$ curing process and examined to determine the extent of haze formation (FIG. 15). These observations indicate that the addition to the concrete mix of 15% GGBFS by weight of cement in combination with 1% gypsum ($CaSO_4.2H_2O$) by weight of cement reduced or eliminated the appearance of haze.

Figure 16:
FIG. 16 Carbonatble calcium silicate cement concrete with no additive (left) compared to similar sample with 1.5 wt % aluminum nitrate and 1 wt % tartaric acid (right). With the addition of aluminum nitrate and tartaric acid, the appearance of haze was eliminated.

A carbonatable calcium silicate cement concrete formulation was prepared with the addition of a liquid admixture which included 1.5% aluminum nitrate by weight of cement in combination with 1.0% tartaric acid by weight of cement. The concrete samples were reacted with a $CO_2$ curing process and examined to determine the extent of haze formation (FIG. 16). These observations indicate that the addition of a liquid admixture to the concrete mix which included 1.5% aluminum nitrate by weight of cement in combination with 1.0% tartaric acid by weight of cement reduced or eliminated the appearance of haze.

Several exemplary concrete mix designs with various haze suppressing additives are shown below. A concrete mix design using solid calcium aluminate to suppress the formation of haze is shown in Table 1. A concrete mix design using solid calcium sulfoaluminate aluminate to suppress the formation of haze is shown in Table 2. A concrete mix design using a liquid calcium nitrate based admixture to suppress the formation of haze is shown in Table 3. A concrete mix design using a blended cement composed of a carbonatable calcium silicate cement, ground granulated blast furnace slag, and gypsum is shown in Table 4. A concrete mix design using a liquid admixture composed of aluminum nitrate and tartaric acid is shown in Table 5.

TABLE 1

Carbonatable calcium silicate based concrete mix design incorporating calcium aluminate to suppress haze.

| Cement (Mass %) | Sand (Mass %) | Aggregate (Mass %) | W/C Ratio | Calcium Aluminate |
|---|---|---|---|---|
| 13.93% | 45.0% | 41.0% | 0.34 | 0.07% |

TABLE 2

Carbonatable calcium silicate based concrete mix design incorporating calcium sulfoaluminate to suppress haze.

| Cement (Mass %) | Sand (Mass %) | Aggregate (Mass %) | W/C Ratio | Calcium Sulfoaluminate |
|---|---|---|---|---|
| 13.93% | 45.0% | 41.0% | 0.34 | 0.07% |

TABLE 3

Carbonatable calcium silicate based concrete mix design incorporating calcium nitrate solution to suppress haze.

| Cement (Mass %) | Sand (Mass %) | Aggregate (Mass %) | W/C Ratio | 30% $Ca(NO_3)_{2(aq)}$ |
|---|---|---|---|---|
| 13.93% | 45.0% | 41.0% | 0.34 | 20 ml/kg of cement |

TABLE 4

Carbonatable calcium silicate based concrete mix design incorporating ground granulated blast furnace slag and gypsum addition to suppress haze.

| Cement (Mass %) | Sand (Mass %) | Aggregate (Mass %) | W/C Ratio | GGBFS | Gypsum |
|---|---|---|---|---|---|
| 11.26% | 45.0% | 41.0% | 0.34 | 1.7% | 1.0% |

TABLE 5

Carbonatable calcium silicate based concrete mix design incorporating a liquid admixture composed of aluminum nitrate and tartaric acid to suppress haze.

| Cement (Mass %) | Sand (Mass %) | Aggregate (Mass %) | W/C Ratio | Aluminum Nitrate | Tartaric Acid |
|---|---|---|---|---|---|
| 13.93% | 44.7% | 41.0% | 0.34 | 0.21% | 0.14% |

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A method for mitigating or reducing hazing on a concrete product, comprising:
    prior to curing cement to form a concrete product, adding to the concrete mixture an admixture comprising one or more components capable of reacting with one or more of soluble alkali, alkaline earth, sulfate or chloride ions to form a low solubility material; and
    wherein the admixture comprises at least one highly soluble calcium salt.

2. The method of claim 1, further comprising:
curing the cement to form a concrete product.

3. The method of claim 1, wherein adding to cement an admixture comprises adding a solid admixture.

4. The method of claim 1, wherein adding to cement an admixture comprises adding a liquid admixture.

5. The method of claim 1, wherein adding to cement an admixture comprises adding a solid admixture and a liquid admixture.

6. The method of claim 1, wherein the cement is a carbonatable calcium silicate-based cement.

7. The method of claim 6, wherein the carbonatable calcium silicate-based cement comprises calcium silicate and one or more discrete calcium silicate phases selected from CS (wollastonite or pseudowollastonite), C3 S2 (rankinite), C2S (belite, larnite, bredigite), and an amorphous calcium silicate phase at about 30% or more by mass of the total phases.

8. The method of claim 6, wherein in the carbonatable calcium silicate-based cement elemental Ca and elemental Si are present in the composition at a molar ratio from about 0.8 to about 1.2 and metal oxides of Al, Fe and Mg are present in the composition at about 30% or less by mass.

9. The method of claim 6, wherein the admixture is a solid admixture comprising one or more selected from calcium aluminate, calcium hydroxide and calcium sulfoaluminate.

10. The method of claim 6, wherein the admixture is a solid admixture comprising ground granulated blast furnace slag (GGBFS) and/or fly ash.

11. The method of claim 10, wherein the solid admixture further comprises gypsum.

12. The method of claim 11, wherein the amount of GGBFS and/or Fly Ash together account for from about 1% to about 25% by weight of cement mixture, and the amount of gypsum accounts for from about 0.5% to about 10% by weight of cement mixture.

13. The method of claim 9, wherein the solid admixture comprises calcium aluminate and is added to the cement in an amount such that calcium aluminate accounts for about 0.1% to about 10% by weight of the cement mixture.

14. The method of claim 9, wherein the solid admixture comprises calcium sulfoaluminate.

15. The method of claim 9, wherein the solid admixture comprises calcium hydroxide.

16. The method of claim 15, wherein the solid admixture is added to the cement in an amount such that calcium hydroxide accounts for about 0.1% to 10% by weight of the cement mixture.

17. The method of claim 1, wherein the admixture comprises an aqueous solution.

18. The method of claim 1, wherein the highly soluble calcium is selected from calcium nitrate, calcium nitrite, and calcium chloride.

19. The method of claim 1, wherein the admixture comprises calcium nitrate and is added to the cement at 0.5 g to 30 g calcium nitrate per kg of cement.

20. The method of claim 1, wherein the alkali, alkaline earth, sulfate or chloride ions are selected from $Ca^{2+}$, $Na^+$, $K^+$, $Mg^{2+}$, $Cl^-$, and $SO_3^{2-}$ ions.

21. The method of claim 2, wherein curing is by $CO_2$ at a temperature of about 50° C. to about 70° C.

22. The method of claim 21, comprising a temperature ramping period, wherein the temperature of concrete is changed at a controlled heating rate of not more than 15° C. per hour with concurrent relative humidity of greater than about 70%.

* * * * *